United States Patent
Andou

(10) Patent No.: US 11,874,005 B2
(45) Date of Patent: Jan. 16, 2024

(54) AIR CONDITIONER

(71) Applicant: DAIKIN INDUSTRIES, LTD., Osaka (JP)

(72) Inventor: Hiroki Andou, Osaka (JP)

(73) Assignee: Daikin Industries, Ltd., Osaka (JP)

(*) Notice: Subject to any disclaimer, the term of this patent is extended or adjusted under 35 U.S.C. 154(b) by 0 days.

(21) Appl. No.: 18/115,416

(22) Filed: Feb. 28, 2023

(65) Prior Publication Data
US 2023/0204238 A1 Jun. 29, 2023

Related U.S. Application Data

(63) Continuation of application No. PCT/JP2021/026243, filed on Jul. 13, 2021.

(30) Foreign Application Priority Data

Sep. 30, 2020 (JP) .................. 2020-164350

(51) Int. Cl.
*F24F 11/30* (2018.01)
*F24F 11/523* (2018.01)

(52) U.S. Cl.
CPC ............ *F24F 11/30* (2018.01); *F24F 11/523* (2018.01)

(58) Field of Classification Search
CPC ................................ F24F 11/523; F24F 11/30
See application file for complete search history.

(56) References Cited

U.S. PATENT DOCUMENTS

| | | | | |
|---|---|---|---|---|
| 7,798,418 B1* | 9/2010 | Rudd | ................... | F24F 11/0001 454/258 |
| 2014/0099872 A1* | 4/2014 | Matsumoto | .............. | F24F 11/76 454/229 |
| 2015/0032264 A1* | 1/2015 | Emmons | .............. | F24F 11/0001 700/276 |
| 2016/0364313 A1 | 12/2016 | Roth et al. | | |
| 2017/0370605 A1* | 12/2017 | Makino | ................... | F24F 11/36 |
| 2018/0087792 A1* | 3/2018 | Takeda | ...................... | F24F 7/06 |
| 2019/0063769 A1* | 2/2019 | Hokanson | ............ | F24F 11/0001 |

(Continued)

FOREIGN PATENT DOCUMENTS

| | | |
|---|---|---|
| CN | 104930673 A | 9/2015 |
| JP | 62-202944 A | 9/1987 |
| JP | 2004-127047 A | 4/2004 |

(Continued)

OTHER PUBLICATIONS

International Search Report for PCT/JP2021/026243 dated Sep. 28, 2021.

(Continued)

*Primary Examiner* — Mohammad Ali
*Assistant Examiner* — Vincent W Chang
(74) *Attorney, Agent, or Firm* — Birch, Stewart, Kolasch & Birch, LLP

(57) ABSTRACT

An air conditioner includes a detection unit configured to detect a load in a room, a notification unit configured to notify a user of information, and a control unit, in which the control unit causes the notification unit to notify the user that ventilation is necessary when a load condition indicating that a variation of the load detected by the detection unit is within a predetermined range in a first time period is satisfied.

3 Claims, 7 Drawing Sheets

(56) References Cited

U.S. PATENT DOCUMENTS

2019/0331377 A1\* 10/2019 Matsuda .................. F25B 5/02
2021/0356159 A1\* 11/2021 Tamaki ................... F24F 11/46

FOREIGN PATENT DOCUMENTS

JP          2009-168428  A    7/2009
JP          2017-505890  A    2/2017

OTHER PUBLICATIONS

International Preliminary Report on Patentability and English translation of the Written Opinion of the International Searching Authority for International Application No. PCT/JP2021/026243, dated Mar. 28, 2023.

\* cited by examiner

US 11,874,005 B2

AIR CONDITIONER

CROSS REFERENCE TO RELATED APPLICATIONS

This application is a Continuation of PCT International Application No. PCT/JP2021/026243, filed on Jul. 13, 2021, which claims priority under 35 U.S.C. 119(a) to Patent Application No. 2020-164350, filed in Japan on Sep. 30, 2020, all of which are hereby expressly incorporated by reference into the present application.

TECHNICAL FIELD

The present disclosure relates to an air conditioner.

BACKGROUND ART

In order to improve indoor air quality, ventilation is required. For example, Patent Literature 1 discloses an air conditioner in which an area to be air-conditioned is divided into a plurality of areas by a plurality of human body detection sensors, and a ventilation fan provided in an indoor unit is operated when it is detected that there is no person in all the areas.

CITATION LIST

Patent Literature

PATENT LITERATURE 1: Japanese Laid-Open Patent Publication No. 2009-168428

SUMMARY

An air conditioner of the present disclosure performs air conditioning in a room and includes a detection unit configured to detect a load in the room, a notification unit configured to notify a user of information, and a control unit, in which the control unit causes the notification unit to notify the user that ventilation is necessary when a load condition indicating that a variation of the load detected by the detection unit is within a predetermined range in a first time period is satisfied.

DETAILED DESCRIPTION

Hereinafter, embodiments of an air conditioner will be described in detail with reference to the accompanying drawings.

1. Embodiment 1

[1-1. Configuration of Air Conditioner]

Figure 1:
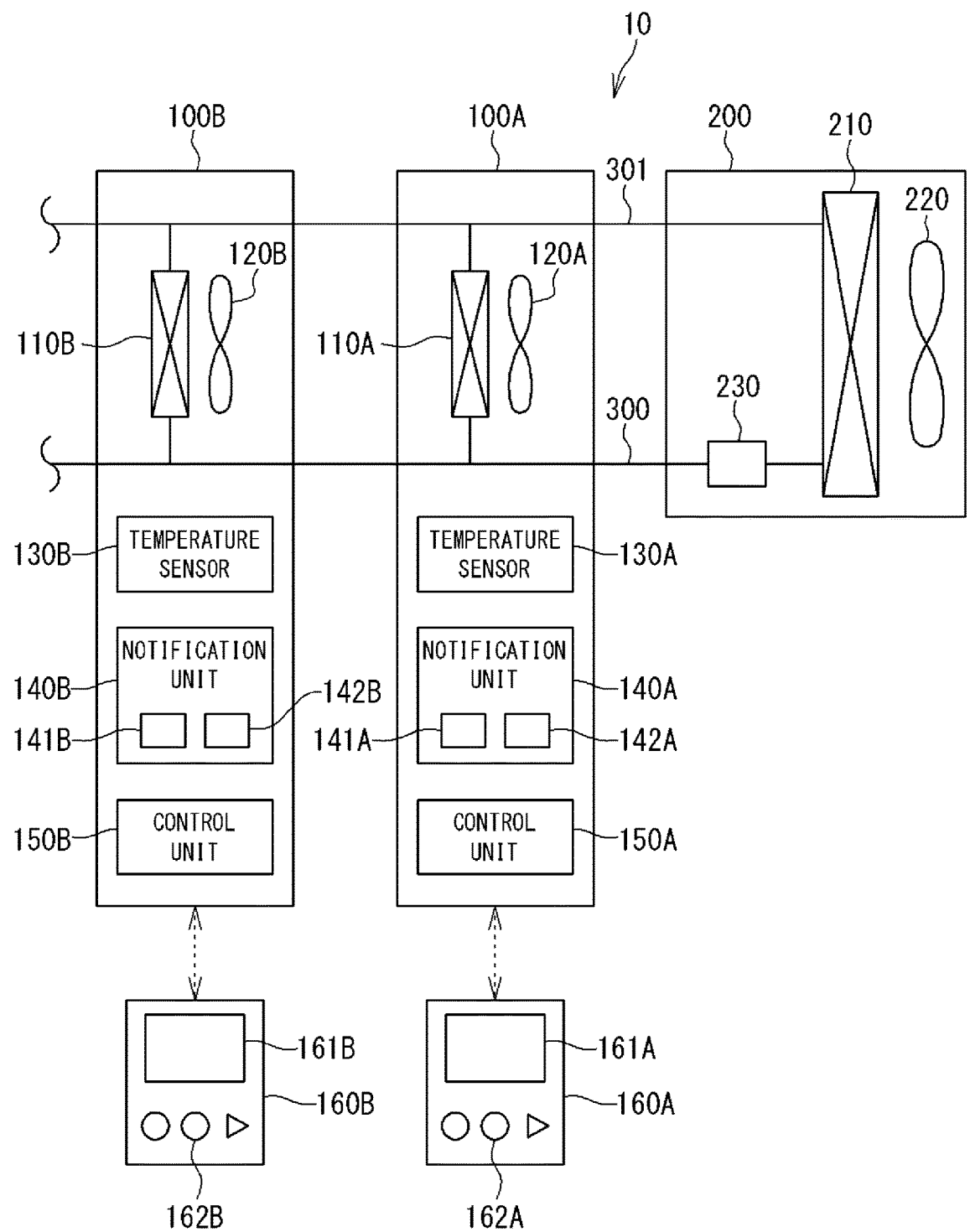
FIG. 1 is a schematic diagram of an example of a configuration of an air conditioner according to Embodiment 1.

FIG. 1 is a schematic diagram of an example of a configuration of an air conditioner according to Embodiment 1.

An air conditioner 10 adjusts a temperature of air in a room, which is a target space for air conditioning, to a predetermined target temperature. The air conditioner 10 according to the present embodiment performs at least one of a heating operation for raising an indoor temperature or a cooling operation for lowering the indoor temperature.

The air conditioner 10 includes indoor units 100A and 100B an outdoor unit 200. The air conditioner 10 according to the present embodiment is a multi-type air conditioner 10 in which the plurality of indoor units 100A and 100B is connected in parallel to the outdoor unit 200, and is applied to a building having multiple rooms, for example. In an example shown in FIG. 1, the two indoor units 100A and 100B are connected to one outdoor unit 200. However, the number of the outdoor units 200 and the number of the indoor units 100 are not limited. Hereinafter, the indoor units 100A and 100B are also collectively referred to as the indoor unit 100. The components of the indoor units 100A and 100B may be collectively referred to in a similar manner.

The air conditioner 10 includes a refrigerant circuit 300. The refrigerant circuit 300 circulates a refrigerant between the indoor units 100 and the outdoor unit 200. The refrigerant circuit 300 includes a compressor 230, an outdoor heat exchanger (heat source heat exchanger) 210, the indoor heat exchangers (utilization heat exchangers) 110A and 110B, and a refrigerant pipe 301 connecting all of the above. The refrigerant circuit 300 includes valves (not shown) such as an expansion valve, a liquid shutoff valve, a gas shutoff valve, and a four-way switching valve, but details thereof are omitted.

Each of the indoor units 100A and 100B is installed in a separate room. The indoor unit 100A performs air conditioning in one room, and the indoor unit 100B performs air conditioning in another room.

The indoor unit 100 includes an indoor heat exchanger 110 included in the refrigerant circuit 300. The indoor heat exchanger 110 is a cross fin tube type or microchannel type heat exchanger, and is used for exchanging heat with indoor air.

The indoor unit 100 further includes an indoor fan 120. The indoor fan 120 is configured to take indoor air into the indoor unit 100, cause the indoor heat exchanger 110 to exchange heat with the air taken in, and then blow the air into the room. The indoor fan 120 includes a motor of which number of revolutions is adjustable by inverter control.

The indoor unit 100 further includes a temperature sensor 130, a notification unit 140, and a control unit 150. The temperature sensor 130 detects an indoor temperature. The indoor temperature is an example of an indoor load.

The notification unit 140 can notify a user that ventilation is necessary. The notification unit 140 includes an LED 141 and a buzzer 142. The LED 141 notifies the user that ventilation is necessary by emitting light, and the buzzer 142 notifies the user that ventilation is necessary by emitting a sound.

Figure 2:
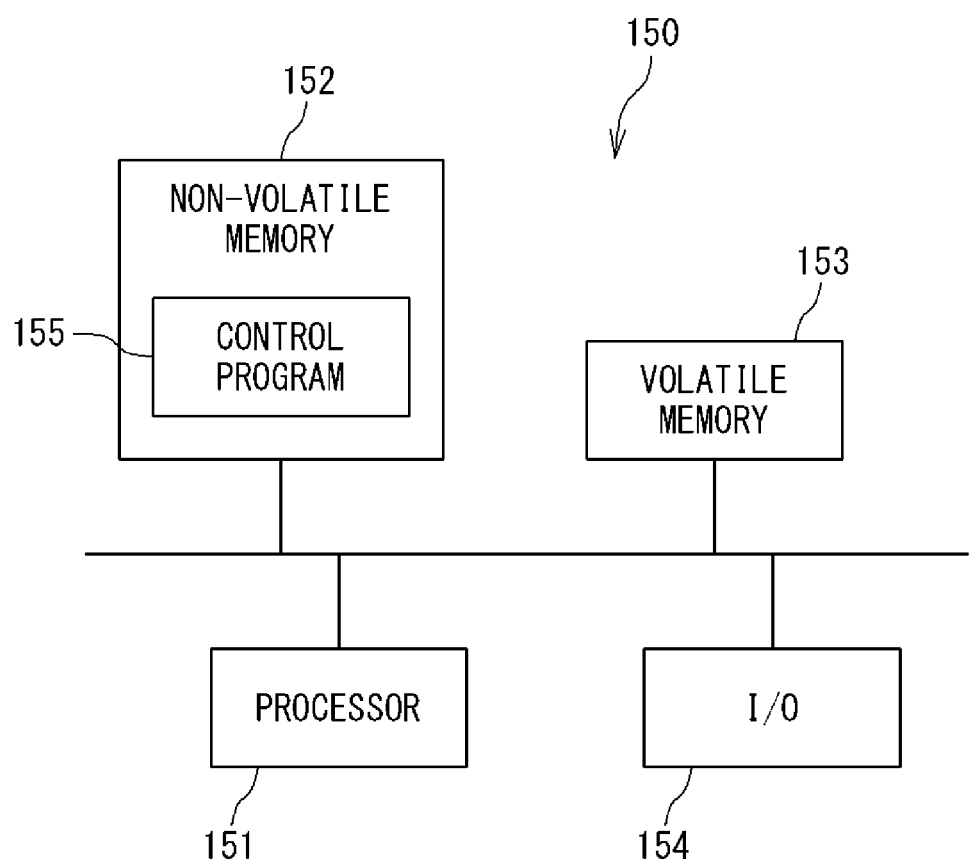
FIG. 2 is a block diagram showing an example of a configuration of a control unit.

The control unit 150 can control components of the indoor unit 100. FIG. 2 is a block diagram showing an example of a configuration of the control unit. The control unit 150 includes a processor 151, a non-volatile memory 152, a volatile memory 153, and an input-output interface 154.

The volatile memory 153 is, for example, a static random access memory (SRAM), a dynamic random access memory (DRAM), or the like. The non-volatile memory 152 is, for example, a flash memory, a hard disk, a read only memory (ROM), or the like. The non-volatile memory 152 stores a control program 155 that is a computer program and data used for executing the control program 155. Each function of the indoor unit 100 is exerted by the control program 155 executed by the processor 151. The control program 155 can be stored in a recording medium such as a flash memory, a ROM, or a CD-ROM.

The processor 151 is, for example, a central processing unit (CPU). However, the processor 151 is not limited to the CPU. The processor 151 may be a graphics processing unit (GPU). The processor 151 may be, for example, an application specific integrated circuit (ASIC) or a programmable logistic device such as a gate array and a field programmable gate array (FPGA). In this case, the ASIC or the programmable logic device is configured to be able to execute processing similar to the processing of the control program 155.

The input-output interface 154 is used to input and output data between the control unit 150 and the components of the indoor unit 100. The input-output interface 154 is connected to the temperature sensor 130, the LED 141, and the buzzer 142. Furthermore, the input-output interface 154 is connected to a communication unit (not shown), and can transmit a signal to a remote controller 160 via the communication unit and receive a signal from the remote controller 160.

The remote controller 160 includes a display 161 and an operation unit 162. The display 161 includes, for example, a liquid crystal panel, and displays information such as a set operating mode (cooling mode, heating mode, and the like) and a set temperature. The operation unit 162 includes, for example, a plurality of button switches, and can receive an operation from the user. The user can designate the operating mode and the set temperature by operating the operation unit 162. The remote controller 160 includes a communication unit (not shown), and can transmit command values of the operating mode and the set temperature received from the user to the control unit 150. The control unit 150 controls each part of the components of the indoor unit 100 in accordance with the received command values of the operating mode and the set temperature.

The display 161 can display notification information to the user. When an event requiring notification of information to the user occurs, the control unit 150 transmits display command for a notification information to the remote controller 160. When receiving the command, the remote controller 160 causes the display 161 to display the notification information.

FIG. 1 is referred to again.

The outdoor unit 200 includes the compressor 230 and the outdoor heat exchanger 210 included in the refrigerant circuit 300.

The compressor 230 sucks a low-pressure gas refrigerant and discharges a high-pressure gas refrigerant. The compressor 230 includes a motor of which number of revolutions is adjustable by inverter control and compresses the gas refrigerant by the motor. The outdoor heat exchanger 210 is, for example, a cross fin tube type or microchannel type heat exchanger, and is used for exchanging heat with a refrigerant by using air as a heat source.

The outdoor unit 200 further includes an outdoor fan 220. The outdoor fan 220 includes a motor of which number of revolutions is adjustable by inverter control. The outdoor fan 220 is configured to take outdoor air into the outdoor unit 200, cause the outdoor heat exchanger 210 to exchange heat with the air taken in, and then blow the air out of the outdoor unit 200.

When the air conditioner 10 having the above configuration performs the cooling operation or the heating operation, the liquid or gaseous refrigerant circulates through the refrigerant pipe 301, heat is exchanged between the refrigerant and the outdoor air by the outdoor heat exchanger 210, and heat is exchanged between the refrigerant and the indoor air by the indoor heat exchanger 110. The outdoor air heated or cooled by the outdoor heat exchanger 210 is discharged to outside of the outdoor unit 200 by the outdoor fan 220. The indoor air cooled or heated by the indoor heat exchanger 110 is released from the indoor unit 100 into the room by the indoor fan 120.

[1-2. Operation of Air Conditioner]

The Ministry of Health, Labour and Welfare has proposed ventilation two or more times per hour to prevent a spread of COVID-19 infection. The air conditioner 10 according to the present embodiment determines whether ventilation has been performed for sufficient time during a certain period. When determining that ventilation has not been performed for sufficient time, the air conditioner notifies the user that ventilation is necessary. A load condition is used to determine whether ventilation has been performed for sufficient time during a certain period. The load condition is a condition indicating that a variation of the load in the room is within a predetermined range in a first time period. The air conditioner 10 according to the present embodiment determines whether ventilation has been performed for sufficient time (a second time period $P_2$ or more) once or more in a first time period $P_1$ in accordance with the proposal of the Ministry of Health, Labour and Welfare described above, for example. In the present embodiment, the load condition is that time during which the indoor temperature detected by the temperature sensor 130 deviates from a specified range determined by a reference temperature $T_0$ does not continue for the second time period $P_2$ or more entirely during the first time period $P_1$, the second time period $P_2$ being shorter than the first time period $P_1$. The first time period $P_1$ is, for example, 30 minutes, and the second time period $P_2$ is, for example, 5 minutes.

Figure 3:
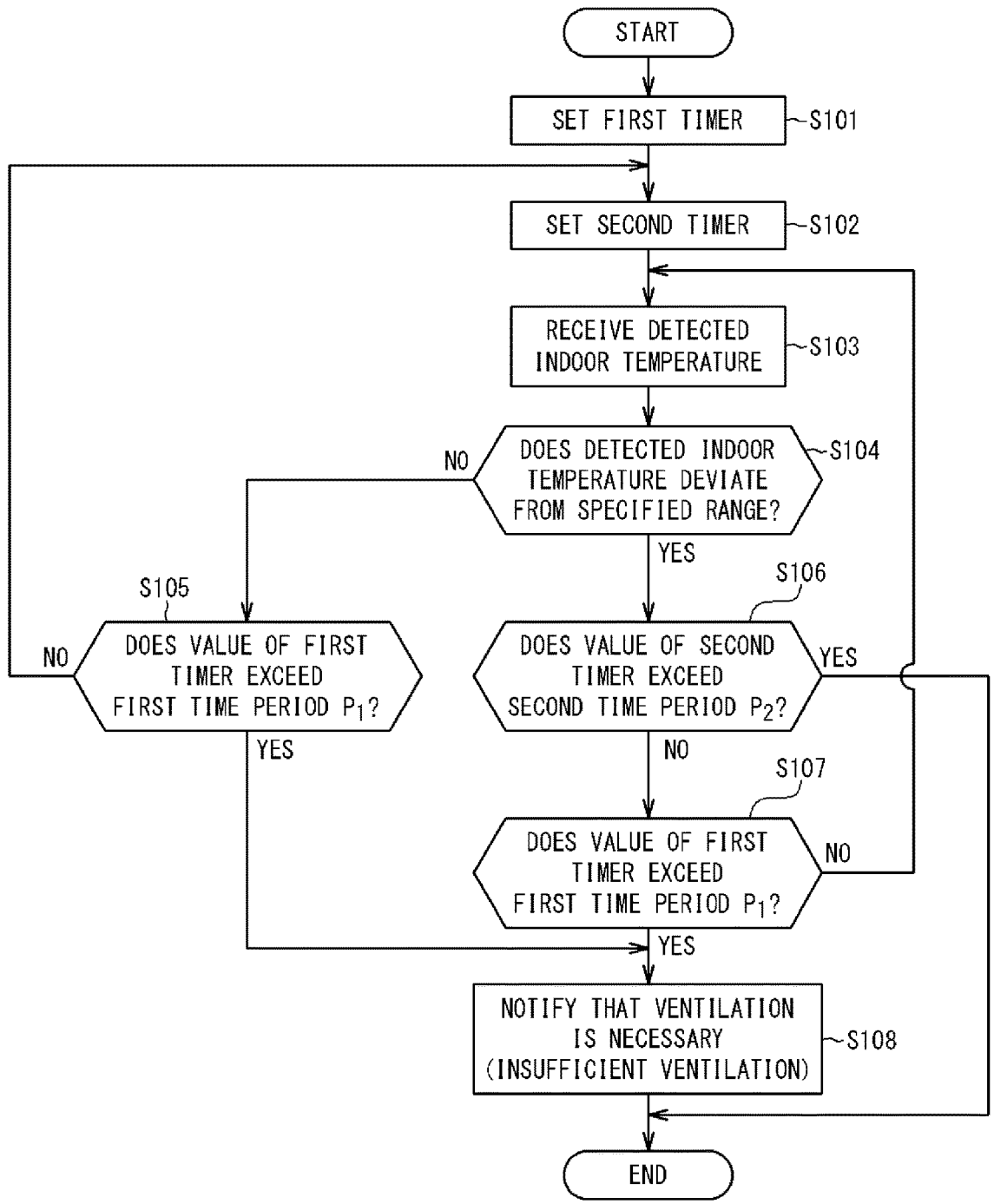
FIG. 3 is a flowchart showing an example of a procedure of operating the air conditioner according to Embodiment 1.

FIG. 3 is a flowchart showing an example of a procedure of operating the air conditioner 10 according to the present embodiment. When the processor 151 activates the control program 155, the processor 151 executes the following processing.

The processor 151 sets a first timer (step S101) and sets a second timer (step S102). The first timer and the second timer are different timers, and can start clocking at different timings.

The temperature sensor 130 detects an indoor temperature at a predetermined cycle and outputs a detected indoor temperature. The processor 151 receives the detected indoor temperature output from the temperature sensor 130 (step S103).

Next, the processor 151 determines whether the detected indoor temperature deviates from a specified range determined by the reference temperature (step S104). The indoor temperature deviates from the outdoor temperature due to heating or cooling, and is close to the set temperature. For example, when ventilation of the room is performed by operating a ventilator or opening a door and a window, the indoor load varies. As a specific example of the variation of the load, the indoor temperature changes to approach the outdoor temperature. Thus, the detected indoor temperature deviates from the specified range. On the other hand, when ventilation is not performed, the indoor temperature maintains a value close to the set temperature. Thus, the detected indoor temperature falls within the specified range. In this manner, in step S104, it is determined whether ventilation is performed on the basis of the variation of the load.

In the present embodiment, the reference temperature is a set temperature (a set temperature for the cooling operation or the heating operation) designated by the user. The specified range is a preset temperature range. For example, the specified range is a range that has an upper limit of a temperature $T_0+S$ which is higher than the reference temperature $T_0$ by a set value S and a lower limit of a temperature $T_0-S$ which is lower than the reference temperature $T_0$ by the set value S. The set value S is set by a service engineer, for example, when the indoor unit 100 is installed in the room. The set value S can be determined in accordance with cooling and heating performance of the air conditioner 10, a size of the room, and the like. The specified range only has to be a temperature range including the reference temperature, and may be a range different from the above.

When the detected indoor temperature does not deviate from the specified range determined by the reference temperature (NO in step S104), it can be determined that ventilation is not performed. In this case, the processor 151 determines whether a value of the first timer exceeds the first time period $P_1$ (step S105). The first time period $P_1$ is a time for determining insufficient ventilation, and is set in advance. The first time period $P_1$ is set, for example, when the air conditioner 10 is shipped from a factory.

When the value of the first timer does not exceed the first time period $P_1$ (NO in step S105), the processor 151 returns to step S102. As a result, the second timer is reset.

When the value of the first timer exceeds the first time period $P_1$ (YES in step S105), the processor 151 proceeds to step S108. Step S108 will be described later.

When the detected indoor temperature deviates from the specified range determined by the reference temperature (YES in step S104), it can be determined that ventilation is performed. In this case, the processor 151 determines whether a value of the second timer exceeds the second time period $P_2$ (step S106). The second time period $P_2$ is a time for determining whether sufficient ventilation is performed, and is set in advance. The second time period $P_2$ is shorter than the first time period $P_1$. The second time period $P_2$ is set, for example, when the air conditioner 10 is shipped from the factory.

When the value of the second timer does not exceed the second time period $P_2$ (NO in step S106), the processor 151 determines whether the value of the first timer exceeds the first time period $P_1$ (step S107). When the value of the first timer does not exceed the first time period $P_1$ (NO in step S107), the processor 151 returns to step S103.

Figure 4A:
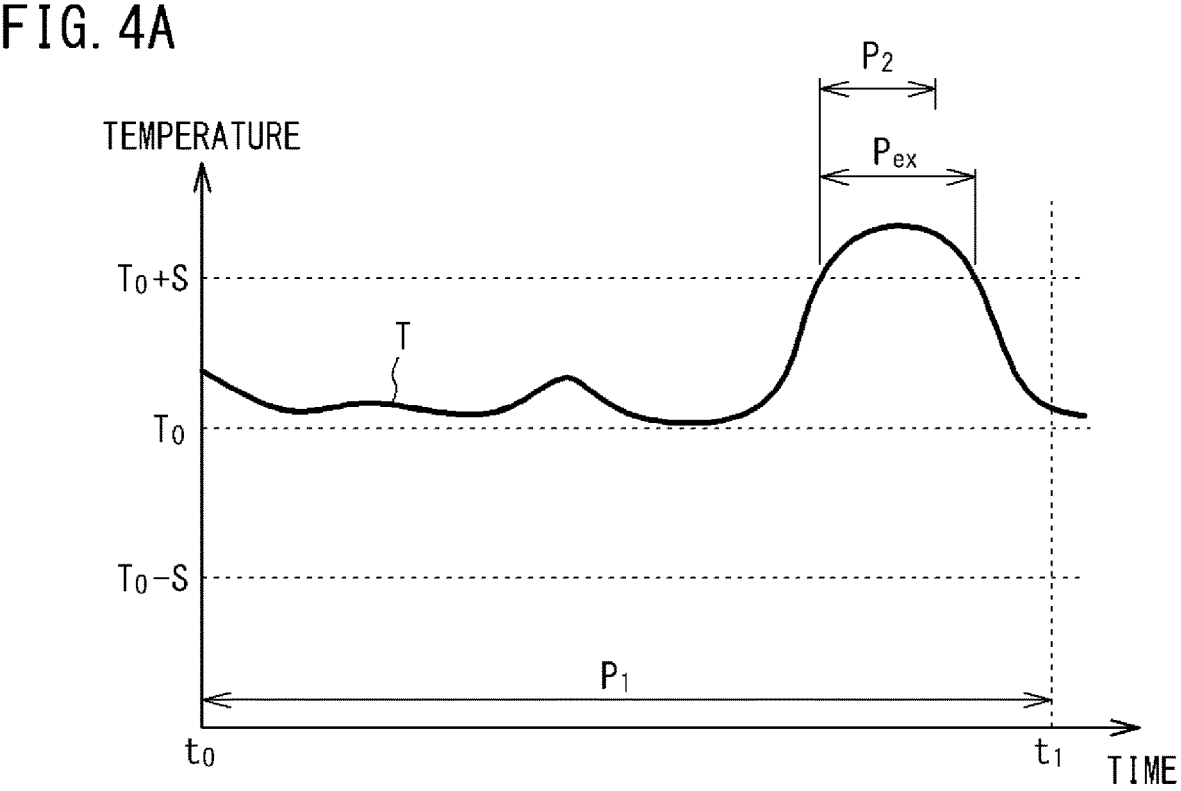
FIG. 4A is a graph showing an example of a temporal change in indoor temperature when ventilation is sufficiently performed.
Figure 4B:
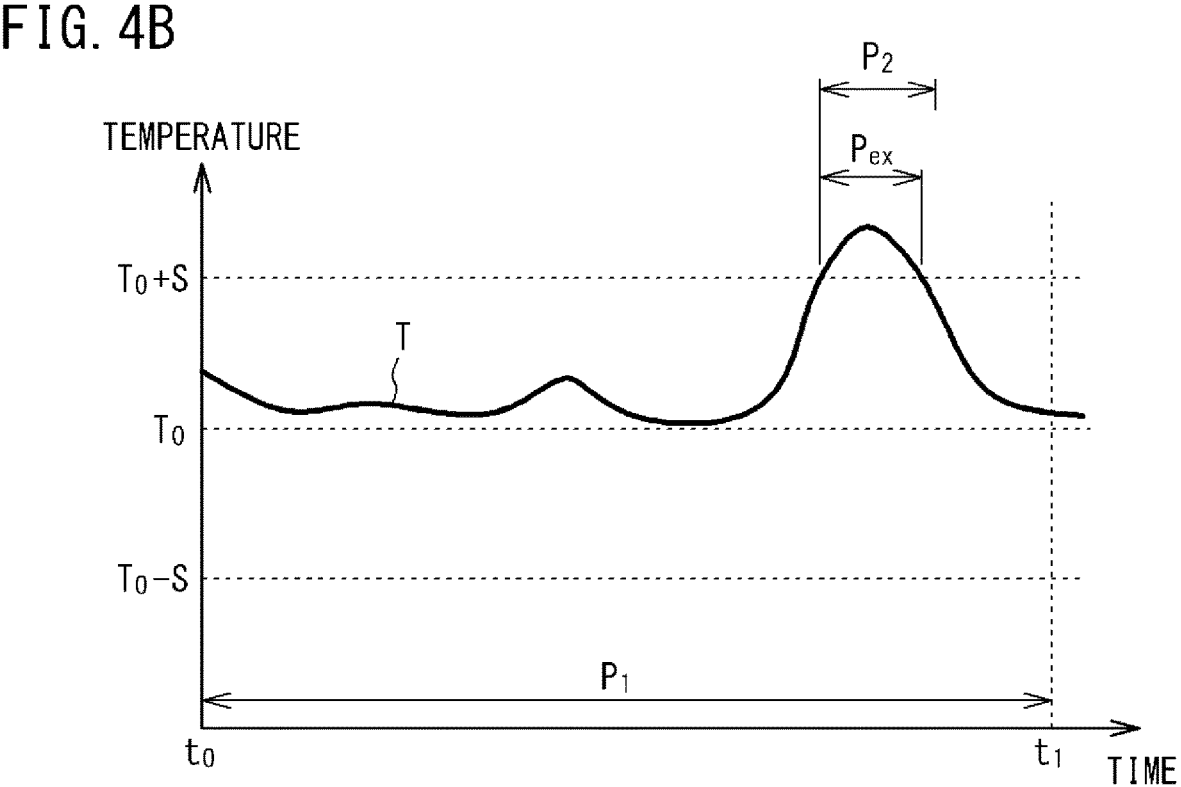
FIG. 4B is a graph showing an example of a temporal change in the indoor temperature when ventilation is not sufficiently performed.

FIG. 4A is a graph showing an example of a temporal change in the indoor temperature when ventilation is sufficiently performed. FIG. 4B is a graph showing an example of a temporal change in the indoor temperature when ventilation is not sufficiently performed. FIG. 4A and FIG. 4B show changes in the indoor temperature in a room where cooling is performed. An air-conditioned indoor temperature T takes a value close to the reference temperature $T_0$ which is a set temperature. When ventilation is not performed, the indoor temperature T maintains a value around the reference temperature $T_0$. When ventilation is performed, the indoor temperature T changes and exceeds the upper limit $T_0+S$ of the specified range.

In the present embodiment, when the time during which the indoor temperature T deviates from the specified range exceeds the second time period $P_2$, it is determined that sufficient ventilation is performed. In the example of FIG. 4A, a time period $P_{ex}$ during which the indoor temperature T deviates from the specified range determined by the reference temperature $T_0$ exceeds the second time period $P_2$. Therefore, in the example of FIG. 4A, sufficient ventilation is performed.

In the present embodiment, when the time during which the indoor temperature T deviates from the specified range does not exceed the second time period $P_2$, it is determined that sufficient ventilation is not performed. Note that even when the indoor temperature T is within the specified range, it is naturally determined that sufficient ventilation is not performed. In the example of FIG. 4B, the time period $P_{ex}$ during which the indoor temperature T deviates from the specified range determined by the reference temperature $T_0$ does not exceed the second time period $P_2$. Therefore, in the example of FIG. 4A, sufficient ventilation is not performed.

FIG. 3 is referred to again. If NO in step S107, step S103 and subsequent steps are executed without resetting the second timer, and the value of the second timer is added. Therefore, when a state in which the indoor temperature T deviates from the specified range is maintained, steps S103, S104, S106, and S107 are repeated while the value of the second timer does not exceed the second time period $P_2$.

In step S106, when the value of the second timer exceeds the second time period $P_2$ (YES in step S106), it can be determined that ventilation has been performed for sufficient time. In this case, the processor 151 ends the processing.

In step S107, when the value of the first timer exceeds the first time period $P_1$ (YES in step S107), the value of the first timer exceeds the first time period $P_1$ while the value of the second timer does not exceed the second time period $P_2$. Therefore, it can be determined that sufficient ventilation is not performed entirely during the first time period $P_1$. In this case, the processor 151 notifies the user that ventilation is necessary (insufficient ventilation) (step S108). In a case where a ventilation function is not provided in the room, the user who knows that ventilation is necessary can open the window and the door, for example. In a case where a ventilator is provided in the room but is stopped, the user who knows that ventilation is necessary can operate the ventilator.

If YES in step S105, the value of the second timer does not exceed the second time period $P_2$ even once, and the value of the first timer exceeds the first time period $P_1$. In this case, the processor 151 also proceeds to step S108.

Specifically, in step S108, the processor 151 controls the LED 141 to emit light, controls the buzzer 142 to sound, and outputs a command to display the notification information on the display 161. As a result, the user is notified of insufficient ventilation by the light emission of the LED 141, the sounding of the server 142, and the display by the display 161. The notification information displayed on the display 161 includes, for example, text information such as "Ventilation is insufficient. Please perform ventilation."

The notification of insufficient ventilation as described above is performed for each of the indoor units 100A and 100B. When insufficient ventilation occurs in a room in which the indoor unit 100A is installed and insufficient ventilation does not occur in a room in which the indoor unit 100B is installed, the indoor unit 100A notifies insufficient ventilation, and the indoor unit 100B does not notify insufficient ventilation. When insufficient ventilation does not occur in the room in which the indoor unit 100A is installed and insufficient ventilation occurs in the room in which the indoor unit 100B is installed, the indoor unit 100A does not notify insufficient ventilation, and the indoor unit 100B notifies insufficient ventilation. When insufficient ventilation is notified by an LED 141A, a buzzer 142A, and a display 161A in the room in which the indoor unit 100A is installed, the user in the room performs ventilation in the room. When insufficient ventilation is notified by an LED 141B, a buzzer 142B, and a display 161B in the room in which the indoor unit 100B is installed, the user in the room performs ventilation in the room.

2. Embodiment 2

Figure 5:
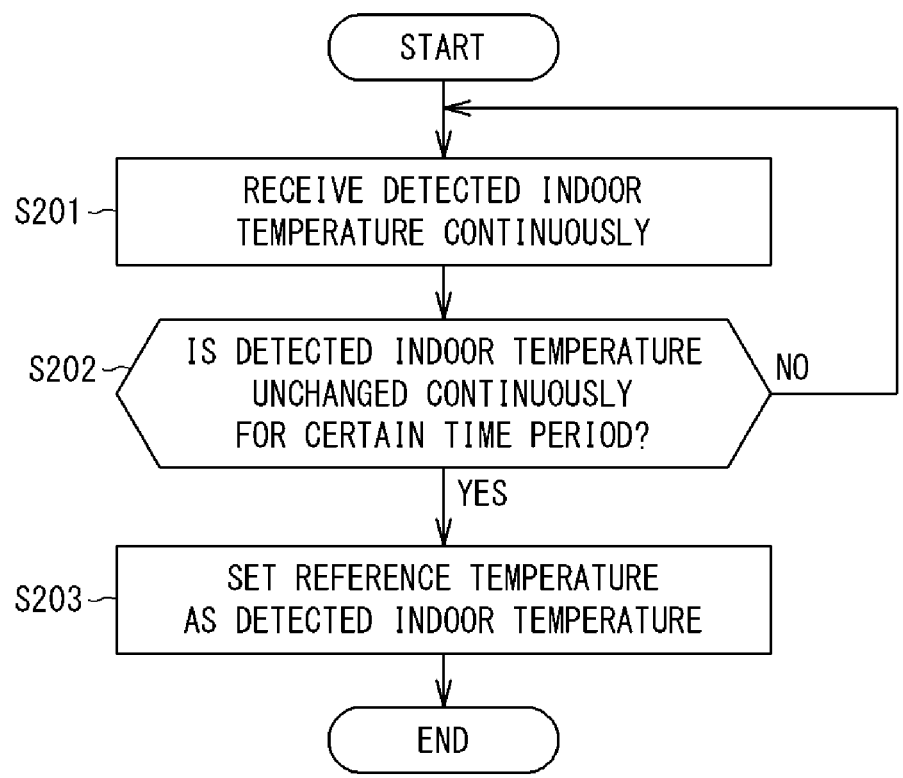
FIG. 5 is a flowchart showing an example of a procedure of setting a reference temperature of an air conditioner according to Embodiment 2.

In the present embodiment, as a result of air conditioning, the reference temperature is set to the converged indoor temperature. FIG. 5 is a flowchart showing an example of a procedure of setting the reference temperature of an air conditioner 10 according to the present embodiment.

The temperature sensor 130 repeatedly outputs a detected indoor temperature at a predetermined cycle. The processor 151 repeatedly receives the detected indoor temperature from the temperature sensor 130 (step S201). In this way, the processor 151 acquires the time-series detected indoor temperature for a certain period. Next, the processor 151 determines whether the detected indoor temperature is unchanged continuously for a certain period (step S202). When the detected indoor temperature is continuously within a certain allowable range in step S202, it can be determined that the detected indoor temperature is unchanged.

When the detected indoor temperature is not unchanged continuously for a certain period (NO in step S202), the processor 151 returns to step S201.

When the detected indoor temperature is unchanged continuously for a certain period (YES in step S202), it can be determined that the indoor temperature has converged to a certain value. In this case, the processor 151 sets the reference temperature as the detected indoor temperature (step S203). The setting of the reference temperature ends here.

The reference temperature set as described above is used for determining whether ventilation described in Embodiment 1 is necessary.

3. Embodiment 3

In the present embodiment, variation of power consumption in the indoor unit 100 is used as the variation of the load in the room.

Figure 6:
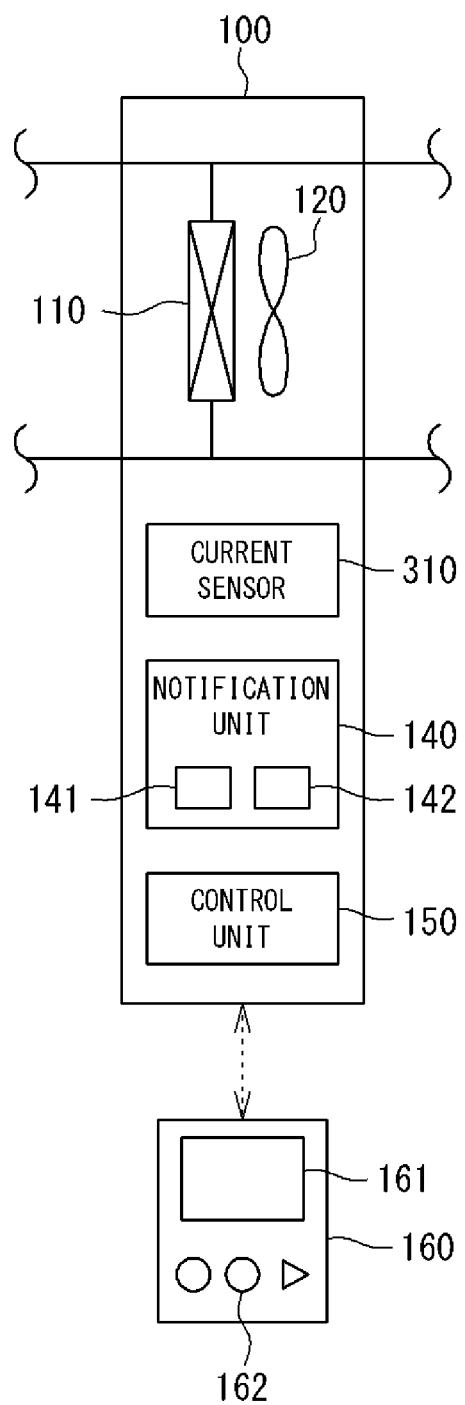
FIG. 6 is a schematic diagram of an example of a configuration of an indoor unit of an air conditioner according to Embodiment 3.

FIG. 6 is a schematic diagram of an example of a configuration of an indoor unit of an air conditioner according to the present embodiment. The indoor unit 100 according to the present embodiment includes a current sensor 310 and a voltage sensor 320. AC power supplied from a commercial power source to the indoor unit 100 is converted into DC power by a power converter (not shown) incorporated in the indoor unit 100. The DC power is supplied to the components of the indoor unit 100, such as the indoor fan 120 and various valves. The current sensor 310 detects an output current of the DC power converter. The voltage sensor 320 detects an output voltage of the DC power converter.

Each of the current sensor 310 and the voltage sensor 320 is connected to the input-output interface 154 (see FIG. 2) of the control unit 150. A detected current value of the current sensor 310 and a detected voltage value of the voltage sensor 320 are provided to the processor 151 via the input-output interface 154. The processor 151 can calculate the power consumption of the indoor unit 100 by using the detected current value and the detected voltage value.

Since other configurations of the indoor unit 100 according to the present embodiment are similar to those of the indoor unit 100 described in Embodiment 1, the same components are denoted by the same reference signs, and description thereof will be omitted.

Figure 7:
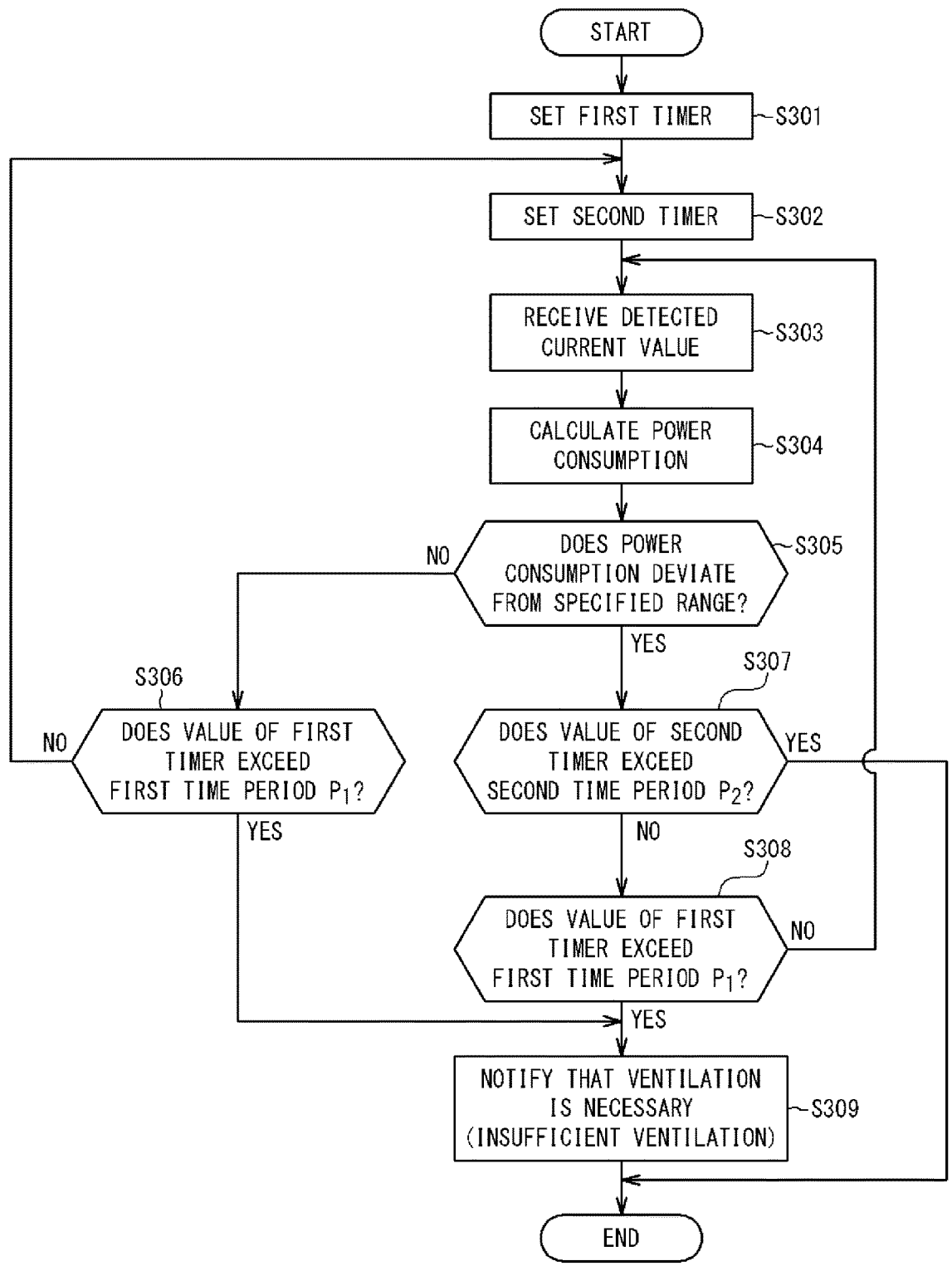
FIG. 7 is a flowchart showing an example of a procedure of operating the air conditioner according to Embodiment 3.

FIG. 7 is a flowchart showing an example of a procedure of operating the air conditioner 10 according to the present embodiment. The processor 151 sets the first timer (step S301) and sets the second timer (step S302).

The current sensor 310 and the voltage sensor 320 detect a current value and a voltage value, respectively, at a predetermined cycle, and outputs a detected current value and a detected voltage value, respectively. The processor 151 receives the detected current value and the detected voltage value output from the current sensor 310 and the voltage sensor 320, respectively (step S303).

Next, the processor 151 calculates the power consumption by using the detected current value and the detected voltage value having been received (step S304). The processor 151 determines whether the power consumption deviates from a specified range determined by a reference power (step S305). The indoor temperature deviates from the outdoor temperature due to heating or cooling, and is close to the set temperature. For example, when ventilation of the room is performed by operating a ventilator or opening a door and a window, the indoor temperature changes to approach the outdoor temperature. When the indoor temperature rises and deviates from the set temperature, the indoor fan 120 and the refrigerant circuit 300 operate with high power consumption to bring the indoor temperature close to the set temperature. Therefore, the power consumption of the indoor unit 100 increases and deviates from the specified range. On the other hand, when ventilation is not performed, the indoor temperature maintains a value close to the set temperature. Therefore, the indoor fan 120 and the refrigerant circuit 300 operate with low power consumption, and the power consumption of the indoor unit 100 falls within the specified range. In this manner, in step S305, it is determined whether ventilation is performed on the basis of the variation of the load.

In the present embodiment, the reference power is power consumption when the indoor unit 100 operates near the set temperature. The specified range is a preset power range.

When the power consumption does not deviate from the specified range determined by the reference power (NO in step S305), it can be determined that ventilation is not performed. In this case, the processor 151 determines whether the value of the first timer exceeds the first time period $P_1$ (step S306).

When the value of the first timer does not exceed the first time period $P_1$ (NO in step S306), the processor 151 returns to step S302. As a result, the second timer is reset.

When the value of the first timer exceeds the first time period $P_1$ (YES in step S306), the processor 151 proceeds to step S309.

When the power consumption deviates from the specified range determined by the reference power (YES in step S305), it can be determined that ventilation is performed. In this case, the processor 151 determines whether the value of the second timer exceeds the second time period $P_2$ (step S307).

When the value of the second timer does not exceed the second time period $P_2$ (NO in step S307), the processor 151 determines whether the value of the first timer exceeds the first time period $P_1$ (step S308). When the value of the first timer does not exceed the first time period $P_1$ (NO in step S308), the processor 151 returns to step S303.

If NO in step S308, step S303 and subsequent steps are executed without resetting the second timer, and the value of the second timer is added. Therefore, when a state in which the power consumption deviates from the specified range is maintained, steps S303, S304, S305, S307, and S308 are repeated while the value of the second timer does not exceed the second time period $P_2$.

In step S307, when the value of the second timer exceeds the second time period $P_2$ (YES in step S307), it can be determined that ventilation has been performed for sufficient time. In this case, the processor 151 ends the processing.

In step S308, when the value of the first timer exceeds the first time period $P_1$ (YES in step S308), the value of the first timer exceeds the first time period $P_1$ while the value of the second timer does not exceed the second time period $P_2$. Therefore, it can be determined that sufficient ventilation is not performed entirely during the first time period $P_1$. In this case, the processor 151 notifies the user that ventilation is necessary (insufficient ventilation) (step S309).

If YES in step S306, the value of the second timer does not exceed the second time period $P_2$ even once, and the value of the first timer exceeds the first time period $P_1$. In this case, the processor 151 also proceeds to step S309.

4. Functional Effects of Embodiments

Sufficient ventilation is required when a person is in a room in order to suppress a decrease in indoor air quality due to a person's activity in the room. In particular, in order to prevent a spread of the novel coronavirus (COVID-19) infection, the Ministry of Health, Labour and Welfare has proposed ventilation twice or more per hour. However, Patent Literature 1 does not disclose how to perform ventilation when a person is in a room. An object of the present disclosure is to promote sufficient ventilation when a person is in a room.

(1) The air conditioner 10 includes a detection unit (the temperature sensor 130, the current sensor 310, and the voltage sensor 320), the notification unit 140, and the control unit 150. The detection unit detects the load in the room. The notification unit 140 notifies the user of information. The control unit 150 causes the notification unit 140 to notify the user that ventilation is necessary when the load condition indicating that the variation of the load detected by the detection unit is within a predetermined range in the first time period $P_1$ is satisfied.

When the variation of the load in the room is within the predetermined range in the first time period $P_1$, there is a possibility that the ventilation amount in the room is insufficient. By notifying the user that ventilation is necessary when the load condition is satisfied, it is possible to prompt the user to perform ventilation.

(2) The detection unit may include the temperature sensor 130 that detects the temperature in the room. The load condition can be that time during which the indoor temperature detected by the temperature sensor 130 deviates from a specified range determined by a reference temperature $T_0$ does not continue for the second time period $P_2$ or more entirely during the first time period $P_1$, the second time period $P_2$ being shorter than the first time period $P_1$.

Such a configuration allows the load in the room to be detected as a room temperature. Since the air-conditioned room temperature changes when ventilation is performed, it is possible to determine whether the ventilation amount is sufficient on the basis of the variation in the room temperature. When the time during which the room temperature deviates from the specified range from the reference temperature $T_0$ does not continue for the second time period $P_2$ or more entirely during the first time period $P_1$, there is a possibility that the ventilation amount in the room is insufficient. It is possible to eliminate the insufficiency of the ventilation amount by notifying the user that ventilation is necessary.

(3) The air conditioner 10 includes the display 161 that displays information. When the load condition is satisfied, the control unit 150 causes the display 161 to display that ventilation is necessary.

Such a configuration allows the user to know that ventilation is necessary by checking what is displayed on the display 161.

(4) The ventilation function need not be provided in the room in which the air conditioner 10 is installed.

It is possible to prompt the user to perform ventilation by opening a window or a door in the room not provided with the ventilation function.

5. Supplementary Note

The present disclosure should not be limited to the above exemplification, but is intended to include any modification recited in claims within meanings and a scope equivalent to those of the claims.

| REFERENCE SIGNS LIST | |
|---|---|
| 10 | air conditioner |
| 100, 100A, 100B | indoor unit |
| 110, 110A, 110B | indoor heat exchanger |
| 120, 120A, 120B | indoor fan |
| 130, 130A, 130B | temperature sensor |
| 140, 140A, 140B | notification unit |
| 141, 141A, 141B | LED |
| 142, 142A, 142B | buzzer |
| 150, 150A, 150B | control unit |
| 151 | processor |
| 152 | non-volatile memory |
| 153 | volatile memory |
| 154 | input-output interface |
| 155 | control program |
| 160, 160A, 160B | remote controller |
| 161, 161A, 161B | display |
| 162, 162A, 162B | operation unit |
| 200 | outdoor unit |
| 210 | outdoor heat exchanger |
| 220 | outdoor fan |
| 230 | compressor |
| 300 | refrigerant circuit |
| 301 | refrigerant pipe |
| 310 | current sensor |
| 320 | voltage sensor |
| $P_1$ | first time period |
| $P_2$ | second time period |
| T | temperature |
| $T_0$ | reference temperature |

The invention claimed is:

1. An air conditioner for performing air conditioning in a room, the air conditioner comprising:
 a detector configured to detect a load in the room;
 a notification output configured to notify a user of information; and
 a controller, wherein
 the controller causes the notification output to notify the user that ventilation is necessary when a load condition indicating that a variation of the load detected by the detector is within a predetermined range in a first time period is satisfied, wherein
 the detector includes a temperature sensor configured to detect a temperature in the room, and
 the load condition is a time during which the temperature in the room detected by the temperature sensor deviates from a specified range determined by a reference temperature does not continue for a second time period or more entirely during the first time period, the second time period being shorter than the first time period.

2. The air conditioner according to claim 1, wherein
 the notification output includes a display configured to display information, and
 the controller causes the display to display that ventilation is necessary when the load condition is satisfied.

3. The air conditioner according to claim 1, wherein a ventilation function is not provided in the room.

* * * * *